(12) United States Patent
Morales et al.

(10) Patent No.: US 12,107,997 B1
(45) Date of Patent: Oct. 1, 2024

(54) MACHINE LEARNING PREFLIGHT PRINTING SYSTEM AND METHODS

(71) Applicant: Kyocera Document Solutions Inc., Osaka (JP)

(72) Inventors: Javier A. Morales, Rochester, NY (US); Matthew Morikawa, Concord, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/126,600

(22) Filed: Mar. 27, 2023

(51) Int. Cl.
*G06N 3/084* (2023.01)
*G06N 3/045* (2023.01)
*H04N 1/00* (2006.01)

(52) U.S. Cl.
CPC ......... *H04N 1/00039* (2013.01); *G06N 3/045* (2023.01); *G06N 3/084* (2013.01)

(58) Field of Classification Search
CPC .... H04N 1/00039; G06N 3/045; G06N 3/084; G06N 3/04; G06N 3/047; G06N 3/088; G06F 3/1208; G06F 3/1256; G06F 18/213; G06F 18/2148; G06T 3/4046; G06T 3/4053; G06V 10/454; G06V 10/82
USPC ....................................................... 358/406
See application file for complete search history.

(56) References Cited

U.S. PATENT DOCUMENTS

| | | | | |
|---|---|---|---|---|
| 2019/0114748 A1* | 4/2019 | Lin | .......................... | G06N 3/08 |
| 2019/0377987 A1* | 12/2019 | Price | ...................... | G06N 3/045 |
| 2020/0005140 A1* | 1/2020 | Cherian | ............... | G05B 13/027 |
| 2020/0034976 A1* | 1/2020 | Stone | ...................... | G06F 18/22 |
| 2020/0176121 A1* | 6/2020 | Dalal | ...................... | G16H 20/60 |
| 2021/0303243 A1* | 9/2021 | Li | ......................... | G06V 10/454 |
| 2022/0139036 A1* | 5/2022 | Bertel | ..................... | G06T 15/04 |
| | | | | 345/418 |
| 2023/0202209 A1* | 6/2023 | Guttman | ................ | B41J 2/0057 |
| | | | | 347/5 |

* cited by examiner

*Primary Examiner* — Negussie Worku
(74) *Attorney, Agent, or Firm* — Millen, White, Zelano & Branigan P.C.; William F. Nixon

(57) ABSTRACT

A printing system includes a printing device. The printing system also includes a preflight system that checks incoming print jobs for possible errors or issues before commencing printing operations. The preflight system implements a generative adversarial network to facilitate the identification of possible problems with printing. The generative adversarial network includes a generative neural network and a discriminatory neural network. The generative neural network introduces errors into input data to train the discriminatory neural network in identifying problems with print jobs. The discriminatory neural network backpropagates its output to train the generative neural network.

15 Claims, 10 Drawing Sheets

MACHINE LEARNING PREFLIGHT PRINTING SYSTEM AND METHODS

FIELD OF THE INVENTION

The present invention relates to a printing system and associated methods to implement a machine learning preflight system to use information for expanding the capability to detect problematic files for correction before printing.

DESCRIPTION OF THE RELATED ART

Many of the people who create jobs for print shops, such as graphic designers, are not aware of good practices required to create portable document format (PDF) files that can print with good fidelity. Thus, print shops will apply prepress, or preflight, checks to incoming files. These checks are meant to catch and, if possible, resolve problems with job files to ensure jobs can raster image process (RIP) and print as expected. Although preflight applications can interrogate PDF files pretty granularly (some applications have over 1000 preflight checks), the correlation between those checks and problems with jobs is based on the previous experience of the print shop.

For example, print shops know that small K text should always overprint or that fonts should be embedded. Checks such as these are deterministic but also limited. These checks cannot catch more subtle problems that only a RIP vendor would be able to understand. In addition, these checks do not catch problems that, while not fatal, nonetheless impact productivity. Some clients may create PDFs in an inefficient manner that may slow down the RIP processor. While it is possible to address certain problems by linearizing and optimizing PDF files, it is not feasible to preprocess every job that comes into a print shop.

SUMMARY OF THE INVENTION

A method for performing a check on a print job is disclosed. The method includes normalizing data within the print job and metadata associated with the print job. The method also includes inputting the normalized data into a neural network. The neural network includes an input layer having input nodes to receive inputs of the normalized data, at least one hidden layer having neural nodes, and an output layer having output nodes. The method also includes processing the normalized data within the at least one hidden layer using the neural nodes. Each neural node multiplies inputs from a previous node by a weight, sums the multiplied inputs, and feeds the summed inputs to an activation function. The method also includes determining outputs for the output nodes from the neural nodes of the at least one hidden layer. The method also includes determining whether the print job includes an issue based on the output of the output nodes.

A computer system for checking a print job prior to printing operations is disclosed. The computer system includes a computer processor. The computer system also includes a computer readable storage device. Stored program instructions on the computer readable storage device for execution by the computer processor configure the processor to normalize data within the print job and metadata associated with the print job. The processor also is configured to input the normalized data into a neural network. The neural network includes an input layer having input nodes to receive inputs of the normalized data, at least one hidden layer having neural nodes, and an output layer having output nodes. The processor also is configured to process the normalized data within the at one hidden layer using the neural nodes. Each neural node multiplies inputs from a previous node by a weight, sums the multiplied inputs, and feeds the summed inputs to an activation function. The processor also is configured to determine outputs for the output nodes from the neural nodes of the at least one hidden layer. The processor also is configured to determine whether the print job includes an issue based on the output of the output nodes.

A method for using a neural network for use in checking printing operations at a printing device is disclosed. The method includes normalizing data within a print job and metadata associated with the print job. The method also includes capturing raster image processing (RIP) performance data generated by processing the print job. The method also includes capturing fidelity data generated while printing the print job within the printing device. The method also includes inputting the normalized data, the RIP performance data, and the fidelity data to neural network. The method also includes determining a file modification to the print job based on an output of the neural network.

A method for using a generative adversarial network in printing operations is disclosed. The method includes receiving a print job at the generative adversarial network. The method also includes inputting a random order of data along with normalized data of the print job into a generative network of the generative adversarial network. The method also includes generating output data from the generative network. The output data includes data having a probability of an error. The method also includes inputting the output data from the generative network into a discriminatory network of the generative adversarial network. The method also includes updating the generative network using backpropagation of output from the discriminatory network.

A method for using a generative adversarial network to detect potential problems in printing operations is disclosed. The method includes generating a generative neural network using random normalized data. The method also includes training a discriminatory neural network using output data of the generative neural network. Output data of the discriminatory neural network is backpropagated into the generative neural network. The method also includes receiving a print job. The method also includes converting the print job into normalized print job data. The method also includes inputting the print job into the discriminatory neural network. The method also includes determining the probability of an error within the print job using the discriminatory neural network.

A printing system having a generative adversarial network for printing operations is disclosed. The printing system includes a processor. The printing system also includes a computer readable storage device. The printing system also includes stored program instructions on the computer readable storage device for execution by the processor. The stored program instructions configure the processor to generate a generative neural network using random normalized data. The processor also is configured to train a discriminatory neural network using output data of the generative neural network. Output data of the discriminatory neural network is backpropagated into the generative neural network. The processor also is configured to receive a print job. The processor also is configured to convert the print job into normalized print job data. The processor also is configured to input the print job into the discriminatory neural network. The processor also is configured to determine the probability of an error within the print job using the discriminatory neural network.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
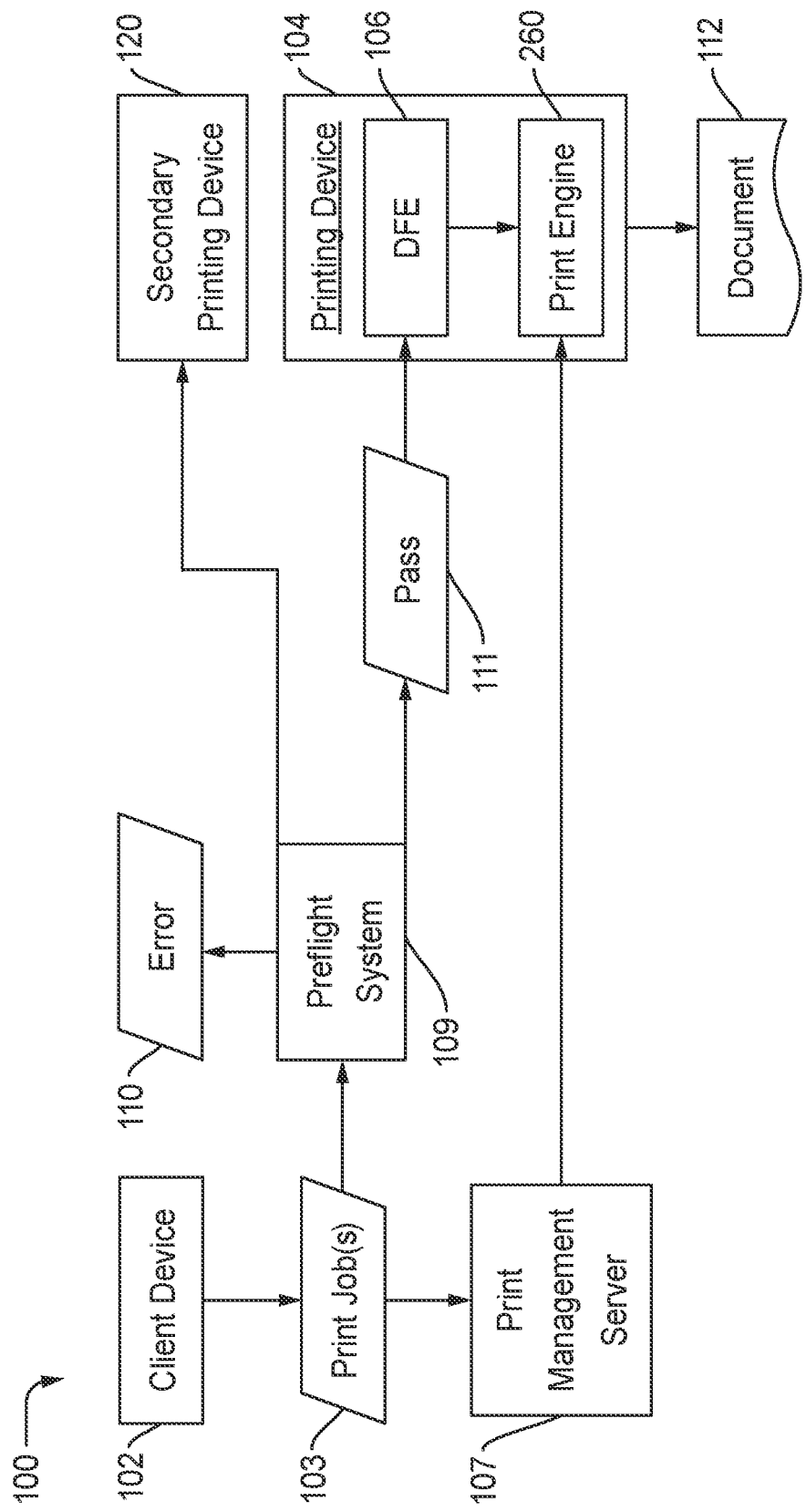
FIG. 1A illustrates a printing system for managing jobs using a preflight system according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a preflight check process that goes beyond the personal experience of the print shop to identify and potentially fix problematic files. The disclosed embodiments provide a machine learning preflight system that is able to use PDF information and RIP information to expand the range of problematic job files to be detected and potentially corrected before printing. In addition to improving preflight performance, the disclosed embodiments also provides a system that significantly improves performance over existing systems by using neural networks to run in parallel and uses computer processing unit acceleration. Current preflight tools process using a linear, rules based check to process individual files. Another feature is that the generative adversarial network (GAN) machine learning method may be able to generate novel models for broken print jobs that would allow for a greater range or problem detection and fixes.

The disclosed machine learning preflight system may have two major elements, which are a training stage and a trained model. The training stage may be broken into two steps. The first step is creating the generative and discriminatory networks. The second step is training them against each other.

In the creation of the network, normalization of data is the first step. Neural networks require data to be fed in a fixed way. This step would normalize the data that will be used for the model. This action involves multiple data sources. Jobs may be normalized by converting into fixed sized, pre-set dictionaries, similarly to how strings are normalized in a natural language processing. For example, for PDF files, this normalization may be done to the raw PDF content, the PDF structure, and the PDF content metadata, as shown in a PDF report.

After normalization, the data is batched together. Once enough data is gathered, the data is used to create a neural network. Once normalization is complete, the two networks are created using the backpropagation training methods. Backpropagation training feeds the normalized data into a fresh network. At the end, checks against known issues are done to determine if an issue should exist.

Examples of issues to consider include RIP processing results for each of the job files. RIP processing results may include RIP error information, warning information when a job is completed with warnings, and error information when a job is completed with errors. Issues to consider also may include RIP processing performance data. The RIP outputs memory usage for various RIP components as well as the processing time for various networks. The preflight check system may, for example, track low or out of memory statuses and the inability to RIP and print at engine speed. Issues to consider also may include fidelity data as gathered by inspection systems used in production printing devices. The preflight check system may, for example, use inline sensors in printing devices to capture image data and compare the image data to a reference representation of the job.

Anytime one of these issues exist in a file and the preflight check system does not detect it, the backpropagation feeds the information back through the network weights to adjust for the error. A network is composed of layers of nodes. Nodes may be input, neural, or output nodes. Neural nodes act to sum up the inputs coming in, multiplied by individualized weights, and then feed them into an activation function, such as a sigmoid function. Each layer, similarly, is composed of all of one kind of node, named an input layer, hidden layers, and an output layer. These is one each of an input layer and an output layer, but any number of hidden layers.

The generative network would be trained to take a working PDF file and generate a broken PDF file. The discriminatory network would take a PDF file and determining whether and how the PDF file is malfunctioning. Once initially trained separately on a prepared data set, the networks would be trained against each other. The generative network would create PDF files that would be mixed in with a working data set and fed into the discriminatory network to train against. This feature allows for a feedback loop of the two networks to continue training against each other to provide an expanded training set with novel problems and solutions. Once the training is complete, the discriminatory network would be able to more accurately perform preflight checks on a print job.

Further, the preflight system may use production data to further train the network. The digital front end (DFE) may extract normalized data from each job that is receives. As the job is processed, the preflight system further captures RIP and fidelity results. This information is used to further train the network in the printing device so that, over time, the preflight system is able to identify more jobs that will be problematic.

If there are multiple printing devices, then the operator may configure the DFEs to share this training data with each other so DFEs are trained using all jobs sent to all printing devices. Alternatively, the training data may be shared with the DFE vendor so that it can be used to refine the initially trained network that is delivered to customers. The vendor additionally may send machine learning network updates to all DFEs used in production printing operations in a manner that would be analogous to how anti-virus software is receives updated virus definitions on an ongoing basis.

The preflight system also would include the option to automatically apply modifications to resolve issues identified by preflight operations. This process would follow the typical preflight correction available from products in the market. Unlike existing products, however, the preflight system would perform a secondary preflight operation and determine whether the file modification has resolved the issues that were identified in the initial preflight operation.

The preflight system also may include a supplemental learning network that would be used to determine which preflight corrections actually resolve issues. This feature would be used to allow the preflight system to learn what file modifications actually resolve issues. It also learns needed modifications that are done simply because users do not understand the low level details about how the RIP processes the file and what actually triggers problems when processing files. This secondary network would be trained using job processing data from corrected PDF files that would be used to adjust the corrections that applied to future jobs.

The supplemental learning network may be trained independently and in parallel from the preflight check network. It, however, would be implemented in the same manner as the network used to identify problems with job files.

For the best results, the training data should have the same proportion of good versus problematic files as customers would see in production. When the system returns production data to the vendor, that information may be used to determine the optimal mix of good versus problematic files. This feature may be used to determine the optimal problems to include in the training set. This information may be used to adjust the training set used for the vendor model in order to limit false positives.

FIG. 1A depicts a printing system 100 for managing jobs using preflight system 109 according to the disclosed embodiments. Printing system 100 may be located in a print shop or other environment suitable for production printing operations. Printing system 100 includes one or more printing devices 104 and 120 that receive print jobs 103 from one or more client devices 102.

Printing device 104 receives print jobs through printing system 100, such as print job 103. After processing print job 103, printing device 104 may print or produce document 112 in a paper or media specified by the print job. Printing device 104 is disclosed in greater detail in FIG. 2. Printing device 104 also includes a controller, or digital front end (DFE), 106, which facilitates processing job 103. DFE 106 also includes components, which are disclosed in greater detail below by FIG. 1B.

For example, DFE 106 may use RIP firmware 290 to convert bitmap images, vector graphics, fonts, and the like associated with pages in print job 103 to bitmap/rasterized representations of the pages, such as C, M, Y, and K pixels. The sum of the values of pixels of a particular color in the rasterized pages may be proportional to the amount of consumables used by printing device 104 to print that color. RIP firmware 290 may rasterize pages of print job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included within printing device 104. Printing device 104 may correspond to an industrial printing device capable of printing thousands of pages in an hour. Printing device 104 may be ink-based, toner-based, or both. Print engine 260 may include various parameters that can control the operation of printing device 104. For example, these settings may include printing device maintenance settings that control or effect head cleaning intervals, head clogging prevention intervals, and the like of printing device 104. Print engine 260 receives raster output from RIP firmware 290 in printing device 104 to print document 112 based on print job 103.

Printing system 100 receives print job 103 and may route it directly to printing device 104. Alternatively, printing system 100 may route print job 103 to print management server 108. Print management server 108 may seek to offload processing of print job 103 from DFE 106 of printing device 104. This feature may be desirable if DFE 106 does not have the processing capacity to handle print jobs 103 in a production printing environment. Thus, print management server 108 also may include a RIP system that can provide raster output directly to print engine 260 of printing device 104. These embodiments allow DFE 106 to offload processing in order to handle other operations.

Printing system 100 also includes preflight system 109. Preflight system 109 analyzes print job 103 before being processed within DFE, 106. Preflight system 109 checks to determine if any possible errors may exist in the document of print job 103. As disclosed below, preflight system 109 uses neural networks that use PDF information and RIP information to expand the range of problematic files that can be detected and corrected before printing. Preflight system 109 determines whether a possible error 110 exists. In some instances, error 110 is a probability of an error occurring by printing operations. If no error exists or if the probability of an error is low, then preflight system 110 may provide a pass 111 to DFE, 106 along with print job 103.

In some embodiments, preflight system 109 is located within DFE 106. Printing device 104 may use preflight system 109 to check incoming print jobs before processing them using the components of DFE 106. Thus, resources within DFE 106 are not tied up unnecessarily on processing print jobs with possible errors. Alternatively, preflight system 109 may be located within print management server 108. This feature offloads the analysis using preflight system 109 and allows for updates to software as needed in a central location. In some embodiments, preflight system 109 may be implemented in client device 102 or as its own separate device or application within printing system 100.

Secondary printing device 120 also is included in printing system 100. Secondary printing device 120 may resemble printing device 104 in terms of function and architecture.

Secondary printing device 120 may provide information and data to preflight system 120 along with any information and data from printing device 104. Preflight system 120 may use the information and data in a machine learning environment to improve its error detection capabilities.

Figure 1B:
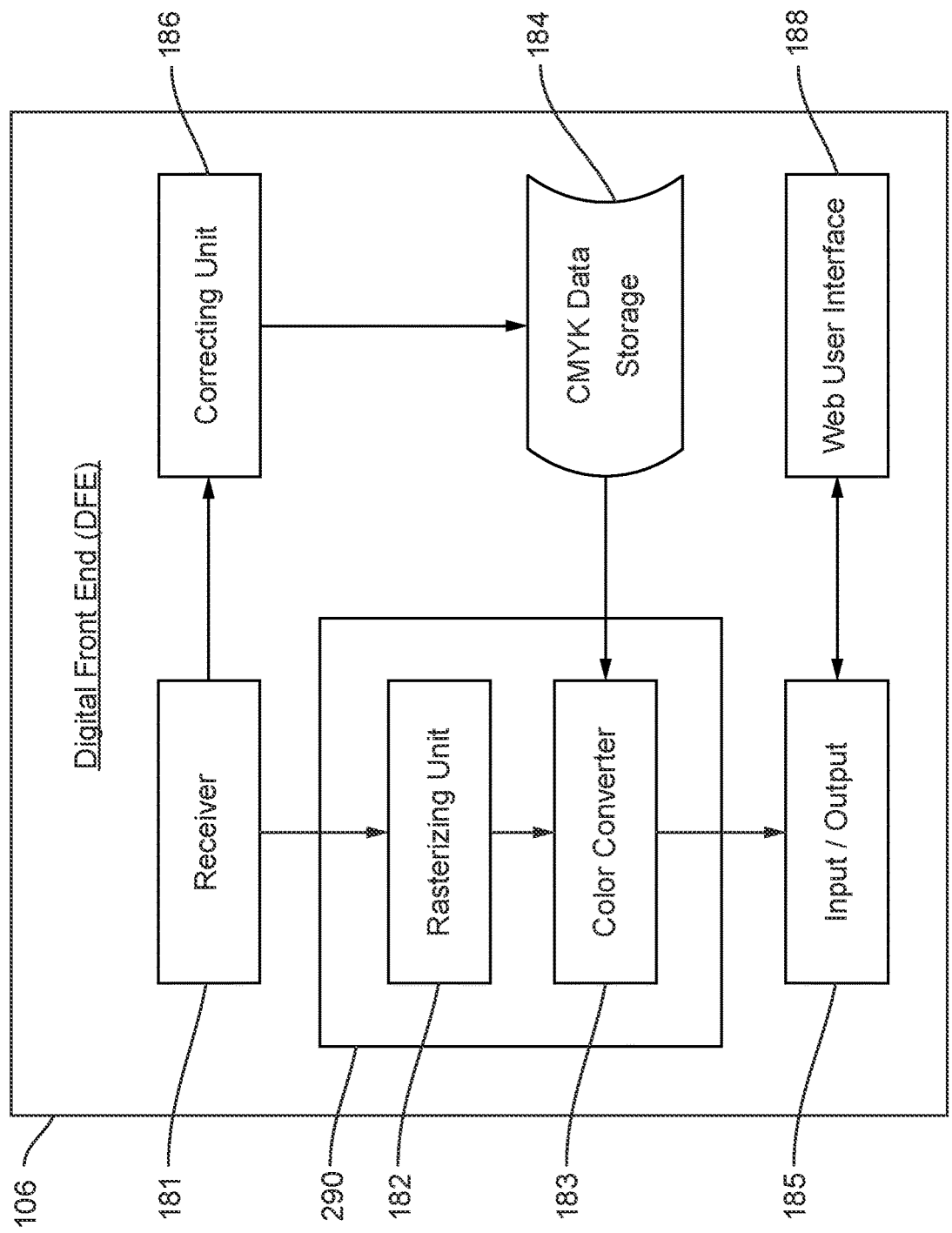
FIG. 1B illustrates a block diagram of a digital front end for a printing device according to the disclosed embodiments.

FIG. 1B depicts a block diagram of DFE 106 according to the disclosed embodiments. DFE 106 includes a receiver 181, an RIP firmware 290 including rasterizing unit 182 and a color converter 183, an CMYK data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also may store preflight system 109, even though it is not shown in FIG. 1B.

Receiver 181 receives a print job 103 received within printing system 100 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs). A TRC refers to data indicating the relationship between a colored gradation value for rendering data and print color, or print density, on a given print medium.

When print color provided by added printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

RIP firmware 290 includes rasterizing unit 182 and color converter 183. The rendering data generated by RIP firmware 290 is transmitted within added printing device 104 via input/output connector 185. The print condition information and the print medium type, as well as the rendering data, may be transmitted to engine 260 found in added printing device 104 disclosed in FIG. 2.

DFE 106 also includes web user interface 188 that may communicate with print management server 108 and printing device 120 using, for example, input/output connector 185. Web user interface 188, or web application, allows a user of the DFEs of other printing devices to interact with content or software running on DFE, 106.

In some embodiments, the connections between the printing devices in the peer-to-peer network may be configured in a full mesh network. Alternatively, the printing devices in the peer-to-peer network may be configured in a partial mesh network. The different configurations may impact how the printing devices communicate to each other for updates, queries, sharing of printing device information, and the like.

Figure 2:
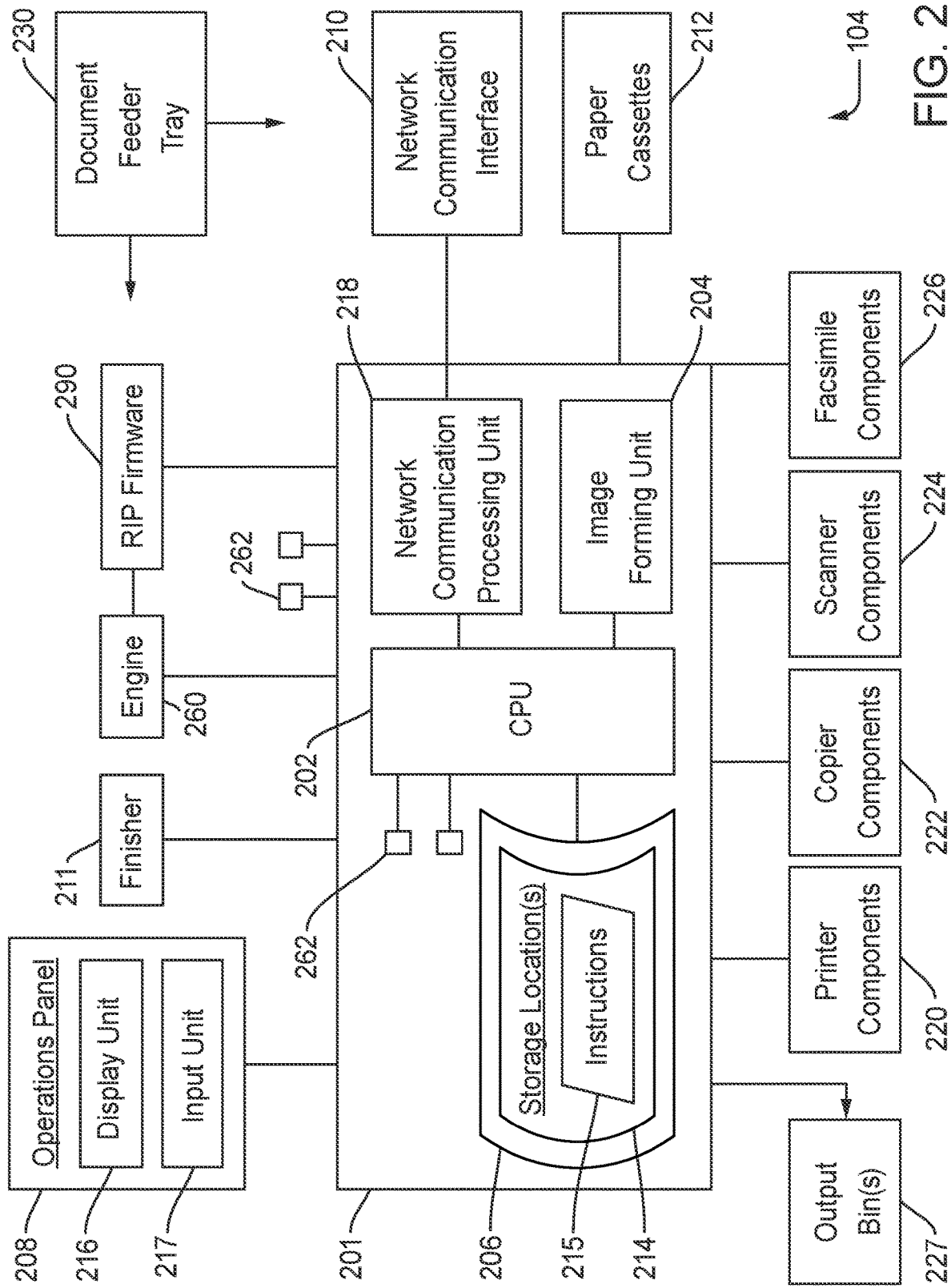
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within printing system 100. As disclosed above, printing device 104 may send and receive data from client device 102, print management server 108, if a separate device, preflight system 109, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at controller 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer that senses touch to receive inputs from the user. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. RIP firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from client device 102 and print management server 108 as well as other printing devices within printing system 100.

Figure 3:
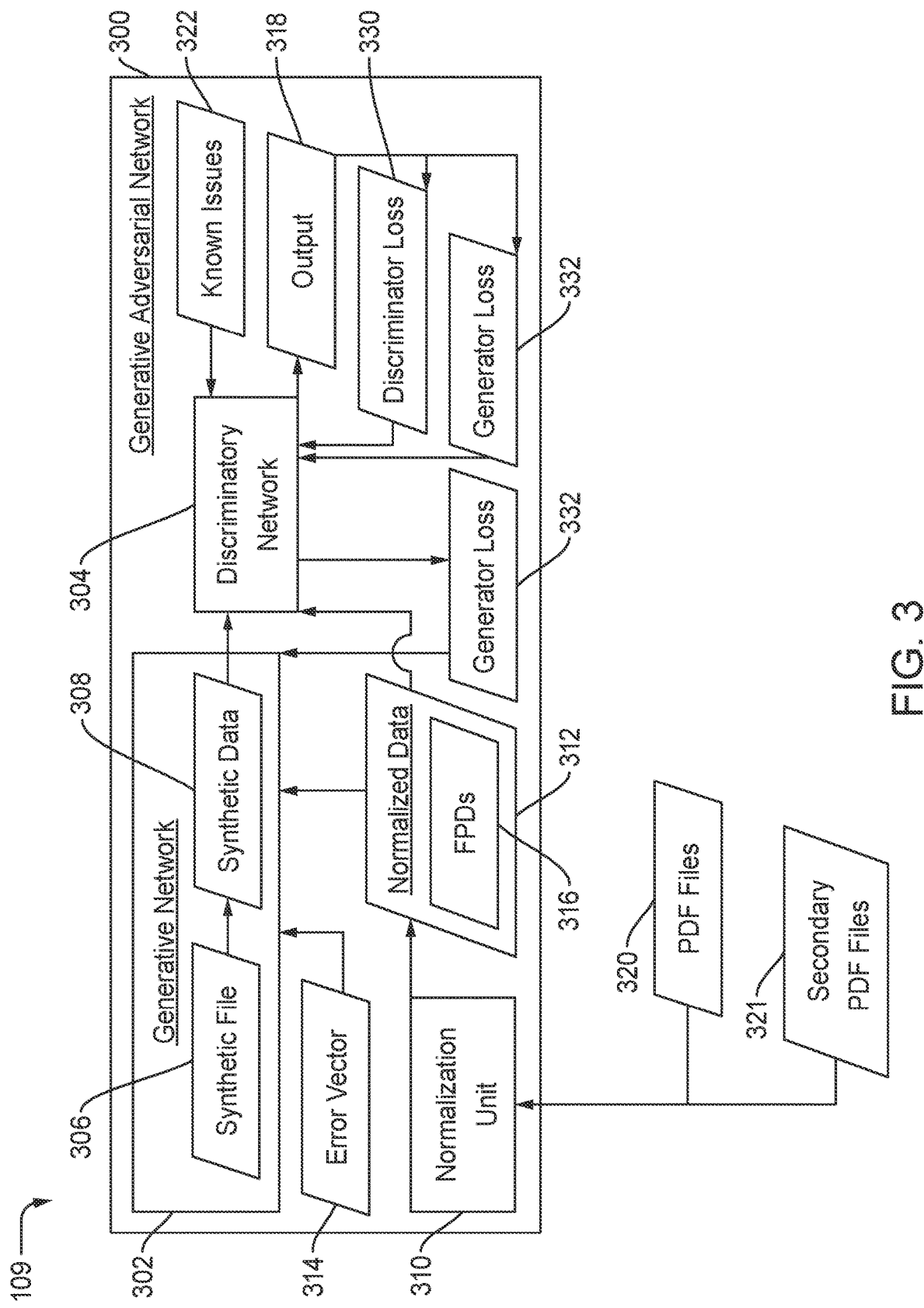
FIG. 3 illustrates a block diagram of a preflight system having a generative adversarial network according to the disclosed embodiments.

FIG. 3 depicts a block diagram of preflight system 109 having a generative adversarial network 300 according to the disclosed embodiments. Generative adversarial network 300 are architectures that use two neural networks against each other in order to generate new, synthetic instances of data that can pass for real data. The disclosed embodiments may use these features to generate synthetic documents that may pass for real PDF documents sent to printing device 104.

Within generative adversarial network 300, generative network, or model, 302 generates new data instances, or synthetic files, or document(s), 306. Discriminatory network, or model, 304 discriminate between different kinds of document instances. Generative network 302 may generate new documents with errors or problems that look like PDF documents received as print jobs 103, while discriminatory network 304 may tell the error or problem document from a regular PDF document.

In some embodiments, generative network 302 captures the probability or joint probability that an error or problem is within a document. Discriminatory network 304 captures the conditional probability that a document has the error or problem. Generative network 302 may include the distribution of data itself to indicate how likely a given error or problem is. Discriminatory network 306 may not concern itself whether a given error or problem is likely, but whether how likely the error or problem is within the document. Generative network 302 learns to generate plausible data. The generated data instances, or documents, become negative training examples for discriminatory network 304. Discriminatory network 306 learns to distinguish the synthetic files 306 having errors from real documents of print jobs 103. Further, discriminatory network 304 may penalize generative network 302 for producing implausible results.

For training, generative network 302 produces synthetic files 306. Discriminatory network 304 learns to tell that synthetic files 306 include are fake. As training progresses, generative network 302 gets closer to producing output that may fool discriminatory network 304. Generative network 302 and discriminatory network 304 are neural networks. The output of generative network 302 is connected directly to the input of discriminatory network 304. Through backpropagation, the output of discriminatory network 304 provides data that generative network 302 uses to update its weights.

Discriminatory network 304 may be a classifier in generative adversarial network 300. It tries to distinguish real PDF document data from synthetic data created by generative network 302. Training data for discriminatory network 304 may come from two sources. Real data instances may relate to PDF files 320. These are disclosed in greater detail below. Training data for discriminatory network 304 also may include fake data instances created by generative network 302. Discriminatory network 304 may use these as negative examples, or documents filled with errors or having problems.

Specifically, discriminatory network 304 may use normalized data 312 for training. Neural networks require data to be fed to them in a fixed way. Thus, data from printing device 104 or printing system 100 may be pre-processed before being used within generative adversarial network 300. Normalization unit 310 may normalize data, which may come from multiple data sources. PDF files 320 may be received as print jobs 103. PDF files 320 also may be known as PDF documents. PDF files 320 may be normalized by converting each document into fixed-sized, pre-set dictionaries 316, similar to how strings are normalized using natural language processing.

For example, normalization unit 310 may process a PDF file of PDF files 320 by normalizing the raw PDF content. PDF content may include text, images, multimedia elements, web page links, and the like. Normalization unit 310 also may normalize the PDF structure of a PDF file. The basic structure of a PDF file may be a header, body, xref table, and a trailer. PDF content may be found in the body but the structure information found in the other components. Normalization unit 310 also may normalized the PDF content metadata for a PDF file, as shown in a PDF report.

The data generated by normalization unit 310 is batched together as normalized data 312. Once enough normalized data 312 is gathered, it is used to create and train generative network 302 and discriminatory network 304. Secondary PDF files 321 also may be provided from secondary printing device 120 to provide additional data to expand the range of problematic job files that may be detected and corrected. When normalization is complete, the two networks are trained using backpropagation training methods.

For example, during training for discriminatory network 304, generative network 302 does not train. The weights of generative network 302 remain constant while it produces synthetic data 308 to train discriminatory network 304. Discriminatory network 304 may connect to two loss functions, discriminator loss 330 and generator loss 332. During training, discriminatory network 304 ignores the generator loss and uses the discriminator loss.

Discriminatory network 304 classifies both normalized data 312 from received PDF files 320 and synthetic data 308 from generative network 302 to generate an output 318. Output 318 is analyzed to determine whether discriminatory loss 330 or generator loss 332 exists. Discriminator loss 330 indicates that discriminatory network 304 misclassified normalized data 312 for a PDF file as fake or synthetic data 308 for synthetic file 306 as real. Discriminatory network 304 updates its weights through backpropagation from discriminator loss 330.

To determine whether a real PDF file is real and a synthetic file is fake, discriminatory network 304 may check against known issues 322. Examples of known issues 322 may include RIP processing results for each of PDF files 320. RIP processing results include RIP error information, warning information when a job is completed with warnings, and error information when a job is completed with errors.

Known issues 322 also may include RIP processing performance data. The RIP needs to output memory usage for various RIP components, such as one or more renderers, as well as the processing time for various operations. The disclosed embodiments may track the following conditions of low or out of memory statuses and the inability to RIP and print at engine speed. Known issues 322 also may include fidelity data as gathered by inspection systems used in printing device 104. Printing system 100, for example, may use inline sensors in printing device 104 to capture image data and compare the image data to a reference representation of the PDF file. A difference may result in an error.

Anytime one of these issues exists in a PDF file and discriminatory network 304 does not detect it, output 318 will result in discriminator loss 330. Generative adversarial network 300 uses backpropagation to feed discriminator loss 330 back through the network weights to adjust for the error.

Generative network 302 learns to create synthetic data 308 by incorporating feedback from discriminatory network 304. Generative network 302 seeks to make discriminatory network 304 classify its synthetic files 306 as real. Training of generative network 302 should result in tighter integration between generative network 302 and discriminatory network 304 than with discriminator training. Generative network 302 is trained with error vector 314, generative network 302 itself, which transforms error vector 314 into synthetic file 306 then to synthetic data 308, discriminatory network 304, which classifies synthetic data 308 and normalized data 312, output 318, and generator loss 332, which penalizes generative network 302 for failing to fool discriminatory network 304.

Neural networks need some form of input. One issue for generative network 302 is using input for a network that outputs entirely new data instances. For example, some generative networks may take random noise as an input. The generative network transforms this noise into a meaningful output. For generative network 302, it may receive PDF files 320. For these files, generative network 302 applies error vector 314 that introduces errors into the PDF files that should be detectable by discriminatory network 304 until the generative network is trained. These errors are manifested in synthetic file 306, which, in turn, is within synthetic data 308. Generative network 302 may normalize its data before presenting synthetic data 308 to discriminatory network 304. Error vector 302 may include data to create a known issue 322. Initially, error vector 302 may include random data.

In training generative network 302, it should be noted that generative network 302 is not directly connected to the loss that is being affected. Generative network 302 feeds into discriminatory network 304 such that the discriminatory network produces output 318. Generator loss 332 penalizes generative network 302 for producing synthetic data 308 that discriminatory network 304 classifies as fake. In other words, discriminatory network 304 properly classifies synthetic data 308 as having a probable error or known issue through output 318, which results in generator loss 332.

This extra feature of generative adversarial network 300 must be included in backpropagation. Backpropagation adjusts each weight in the right direction by calculating the weight's impact on output 318. In other words, how would output 318 change if generative network 302 adjusted the weight. The impact of a weight of generative network 302 depends on the impact of the weight of discriminatory network 304 that it feeds into. Thus, backpropagation starts with output 318 and flows back through discriminatory network 304 into generative network 302.

At the same time, the disclosed embodiments do not want discriminatory network 304 to change during the training of generative network 302. Thus, generative network 302 is trained by using error vector 314, which may initially be random values applied to PDF files 320. Generative network 302 produces synthetic data 308 using PDF files 320 and error vector 314. Discriminatory network 304 classifies synthetic data 308 as having a probable error or not in output 318. Generative adversarial network 300 calculates generator loss 332 from the classification in output 318. Generator loss 332 is backpropagated through both discriminatory network 304 and generative network 302 to obtain the gradients. Generative adversarial network 300 uses the gradients to change only the weights in generative network 302.

Because generative adversarial network 300 includes two separately trained networks, its training process must address two issues. First, generative adversarial network 300 juggles two different kinds of training, generative network 302 and discriminatory network 304. Second, convergence of identifying known issues 322 within generative adversarial network 300 may be difficult to identify. Thus, generative network 302 and discriminatory network 304 have different training processes.

In some embodiments, training of generative adversarial network 300 proceeds in alternating periods. For example, discriminatory network 304 trains for one or more epochs. Then, generative network 302 trains for one or more epochs. These steps are repeated to continue to train generative network 302 and discriminatory network 304. Generative network 302 is kept constant during the training phase for discriminatory network 304. Discriminatory network 304 tries to determine to distinguish normalization data 312 based on PDF files 320 apart from synthetic data 308 based on synthetic files 306 in order to recognize the flaws in generative network 302. This issue is different for a thoroughly trained generative network than it is for an untrained generative network that appears to produce random output.

Generative adversarial network 300 also keeps discriminatory network 304 constant during the training phase for generative network 302. Using this back and forth process, generative adversarial network 300 can tackle problems with detecting errors in documents for printing device 104. As generative network 302 improves with training, discriminatory network 304 performance gets worse because the discriminatory network cannot easily tell the difference between normalized data 302 and synthetic data 308. This feature expands the capability of preflight system 109.

Figure 4:
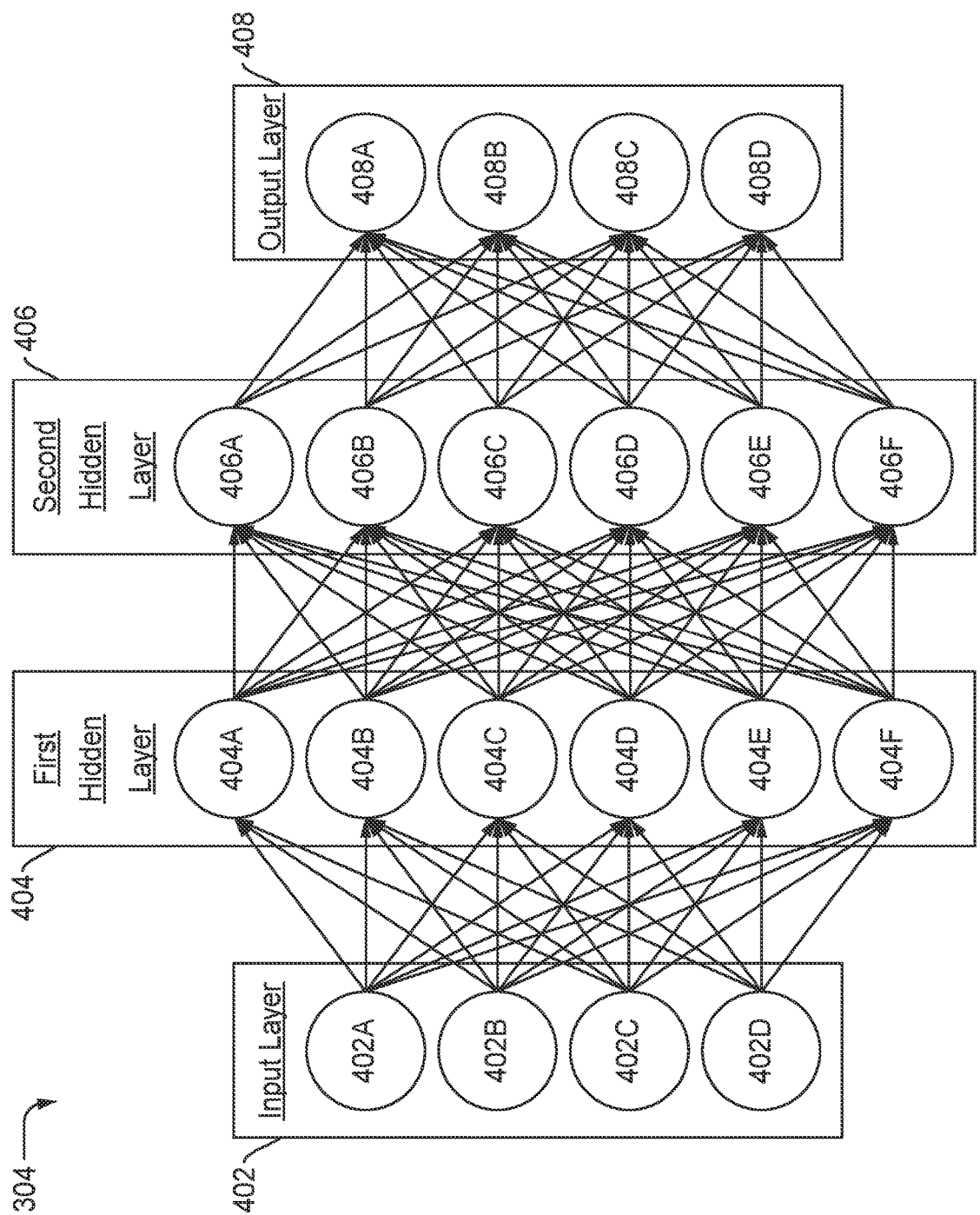
FIG. 4 illustrates a discriminatory network having layers according to the disclosed embodiments.

FIG. 4 depicts a discriminatory network 304 having layers 402, 404, 406, and 408 according to the disclosed embodiments. Discriminatory network 304 is comprised of layers of nodes. Nodes may include input nodes, neural, nodes, and output nodes. Input nodes include normalized data and output nodes include the output results. Neural nodes act to sum up the inputs coming in, multiplied by individualized weights, and then fed into an activation function. An activation function may be a sigmoid function.

Discriminatory network 304 includes input layer 402. Input layer 402 includes input nodes 402A, 402B, 402C, and 402D. Each of the input nodes receives normalized inputs, either from normalized data 312 or synthetic data 308. The normalized data may include fixed sized, pre-set dictionaries generated from a PDF file 320 or a synthetic file 306. Input nodes 402A, 402B, 402C, and 402D feed their respective data instances to the nodes within first hidden layer 404. It should be noted that input layer 402 may include any number of input nodes.

First hidden layer 404 includes neural nodes 404A, 404B, 404C, 404D, 404E, and 404F. Each neural node of first hidden layer 404 receives data from each input node. The data from each input node is weighted according to the training received by discriminatory network 304. These weights may change over time during processing of results within generative adversarial network 300. Inputs are multiplied by the weights and then summed up within each neural node in first hidden layer 404. The result is fed into an activation function. The activation function produces an output value. Thus, each node 404A, 404B, 404C, 404D, 404E, and 404F produces a value, or data instance, to be provided out of first hidden layer 404.

Second hidden layer 406 acts much like first hidden layer 404, except that it receives its input data instances from nodes 404A-F. Thus, each neural node 406A, 406B, 406C, 406D, 406E, and 406F of second hidden layer 406 receives a data instance from each of neural nodes 404A-F of first hidden layer 404. The data from each neural node 404A-F may be weighted, which also may change during training. Neural nodes 406A-F perform the same operations of the neural nodes of first hidden layer 404. The respective activation function within each neural node 406A-F produces an output value, or data instance, that is provided out of second hidden layer 406.

There may be any number of hidden layers within discriminatory network 304. The operations disclosed above are repeated for each hidden layer. Weights from one hidden layer to another may be adjusted with training in discriminatory network 304. The last hidden layer provides its outputs to output nodes of output layer 408. Output layer 408 may include output nodes 408A, 408B, 408C, and 408D. Each output node may provide a value related to the percentage change of an error or issue occurring with the PDF or synthetic file provides to input layer 402. This information is used to determine whether a PDF file is malfunctioning and how it is malfunctioning based on known issues 322. Each output node 408A-D may relate to the change of a known issue occurring within the received PDF file. This output may be included in output 318, and used to determine discriminator loss 330 and generator loss 332.

Figure 5:
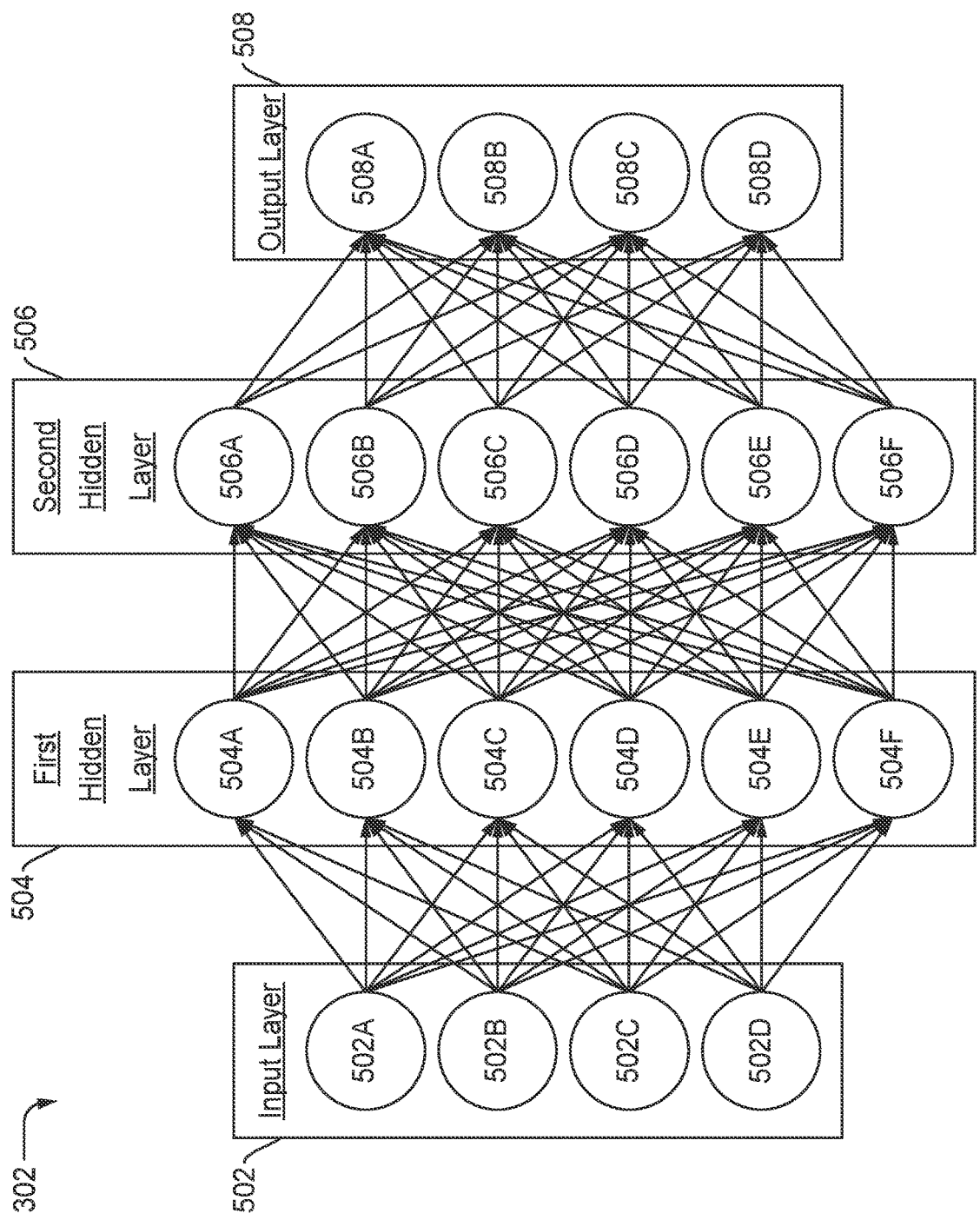
FIG. 5 illustrates a generative network having layers according to the disclosed embodiments.

FIG. 5 depicts generative network 302 having layers 502, 504, 506, and 508 according to the disclosed embodiments. Generative network 302, in many respects, may operate like discriminatory network 306 in that is includes input layer 502, first hidden layer 504, second hidden layer 506, and output layer 508. The normalized inputs for input layer 502 may include error vector 314 that is used to introduce errors into a PDF file 320 related to known issues 322. Thus, the normalized data received at generative network 302 is much like normalized data 312 but includes data from error vector 314 that is included in the normalized data. Input layer 502 includes input nodes 502A, 502B, 502C, and 502D, which may act like input nodes 402A, 402B, 402C, and 402D disclosed above.

First hidden layer 504 includes neural nodes 504A, 504B, 504C, 504D, 504E, and 504F. Each neural node receives a data instance from each of input nodes 502A-D. The data instance from each input node is weighted according to the training received by generative network 302. These weights may change over time during processing of results within generative adversarial network 300. Inputs are multiplied by the weights and then summed up within each neural node in first hidden layer 504. The result is fed into an activation function. The activation function produces an output value. Thus, each node 504A, 504B, 504C, 504D, 504E, and 504F produces a value, or data instance, to be provided out of first hidden layer 504.

Second hidden layer 506 acts much like first hidden layer 504, except that it receives its input data instances from neural nodes 504A-F. Thus, each neural node 506A, 506B, 506C, 506D, 506E, and 506F of second hidden layer 506 receives a data instance from each of neural nodes 504A-F of first hidden layer 504. The data from each neural node 504A-F may be weighted, which also may change during training. Neural nodes 506A-F perform the same operations of the neural nodes of first hidden layer 504. The respective activation function within each neural node 506A-F produces an output value, or data instance, that is provided out of second hidden layer 506.

There may be any number of hidden layers within generative network 302. The operations disclosed above are repeated for each hidden layer. Weights from one hidden layer to another may be adjusted with training in generative network 302. The last hidden layer provides its outputs to output nodes of output layer 508. Output layer 508 may include output nodes 508A, 508B, 508C, and 508D. Each of output nodes 508A-D includes a modified normalized input to be provided to input layer 402 of discriminatory network 304. Thus, the output of generative network 302 differs from the output of discriminatory network 304. The output of output layer 508 may be synthetic data 308, in that the generation of a synthetic file 306 is skipped. Synthetic file 306 is still shown above for illustrative purposes, plus in the event that review may occur on the synthetic file 306 assembled from synthetic data 308.

Figure 6:
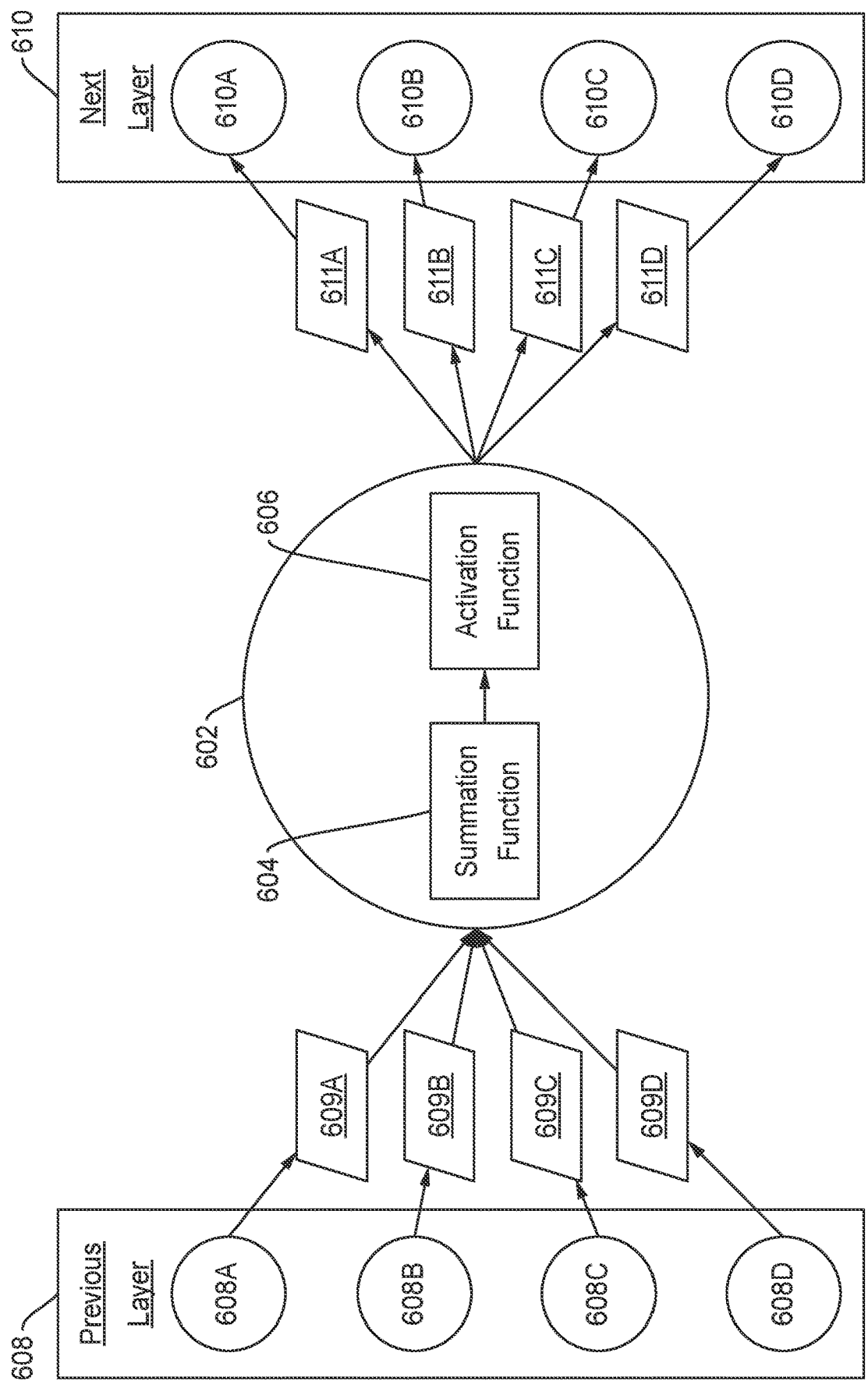
FIG. 6 illustrates an example sigmoid neuron within a neural network according to the disclosed embodiments.

FIG. 6 depicts an example neural node 602 within a neural network according to the disclosed embodiments. Neuron 600 may be an example of a neural node within first hidden layer 504 or second hidden layer 506 of generative network 302 as well as a neural node within first hidden layer 404 or second hidden layer 406 of discriminatory network 304. Neural node 602 includes summation function 604, which sums the products of the data instances multiplied by the applicable weights, as received from the previous layer. Neural node 602 also includes activation function 606, which may be a sigmoid function. The sigmoid function may convert a real value into one that can be interpreted as a probability. Thus, neural node 602 may take a value determined by summation function 604 from the summed products of the data and weights to generate a probability.

Thus, a data instance from node 608A of previous layer 608 may be multiplied by weight 609A. A data instance from node 608B may be multiplied by weight 609B. A data instance from 608C may be multiplied by weight 609C. A data instance from 608D may be multiplied by weight 609D. The products of these operations may be summed by summation function 604. Weights 609A-D may be adjusted as training occurs within generative adversarial network 300. In other instances, weights 609A-D may be held constant while training another network within generative adversarial network 300.

Neural node 602 produces outputs 611A, 611B, 611C, and 611D. These outputs may be probabilities as defined by activation function 606. In other embodiments, it may be normalized input data to be provided to another network. Outputs 611A-D may be data instances. Output 611A may be sent to nodes in next layer 610. Output 611A may be sent to node 610A. Output 611B may be sent to mode 610B. Output 611C may be sent to node 610C. Output 611D may be sent to node 610D. If next layer 610 is a hidden layer, then outputs 611A-D may be multiplied by weights in nodes 610A-D, much like with weights 609A-D and summation function 602.

Thus, neural node 602 may receive input data instances and generate output data instances. Each node may receive data through connections having different weights for that node. It should be noted that different activation functions 606 may be used within different nodes.

Referring back to FIG. 3, once training is complete, discriminatory network 304 should be able to more accurately perform preflight checks in a print job. Preflight system 190 may be provided to printing device 104. Further, generative adversarial network 300 may use production data to further train itself. DFE 106 may extract normalized data from each job that it receives. As the job is processed, preflight system 109 captures RIP and fidelity results. This information may be used to further train generative adversarial network 300 in printing device 104 so that, over time, preflight system 109 is able to identify more jobs that will be problematic.

If there are multiple printing devices in printing system 100, such as secondary printing device 120, then the operator may configure the DFEs in each printing device to share this training data with each other so that the DFEs are using networks trained using all jobs sent to all printing devices. Alternatively, the training data may be shared with the DFE vendor so that it can be used to refine the initially trained generative adversarial network that is delivered to customers. The vendor also may send machine learning network updates to all DFEs used in production printing.

Figure 7:
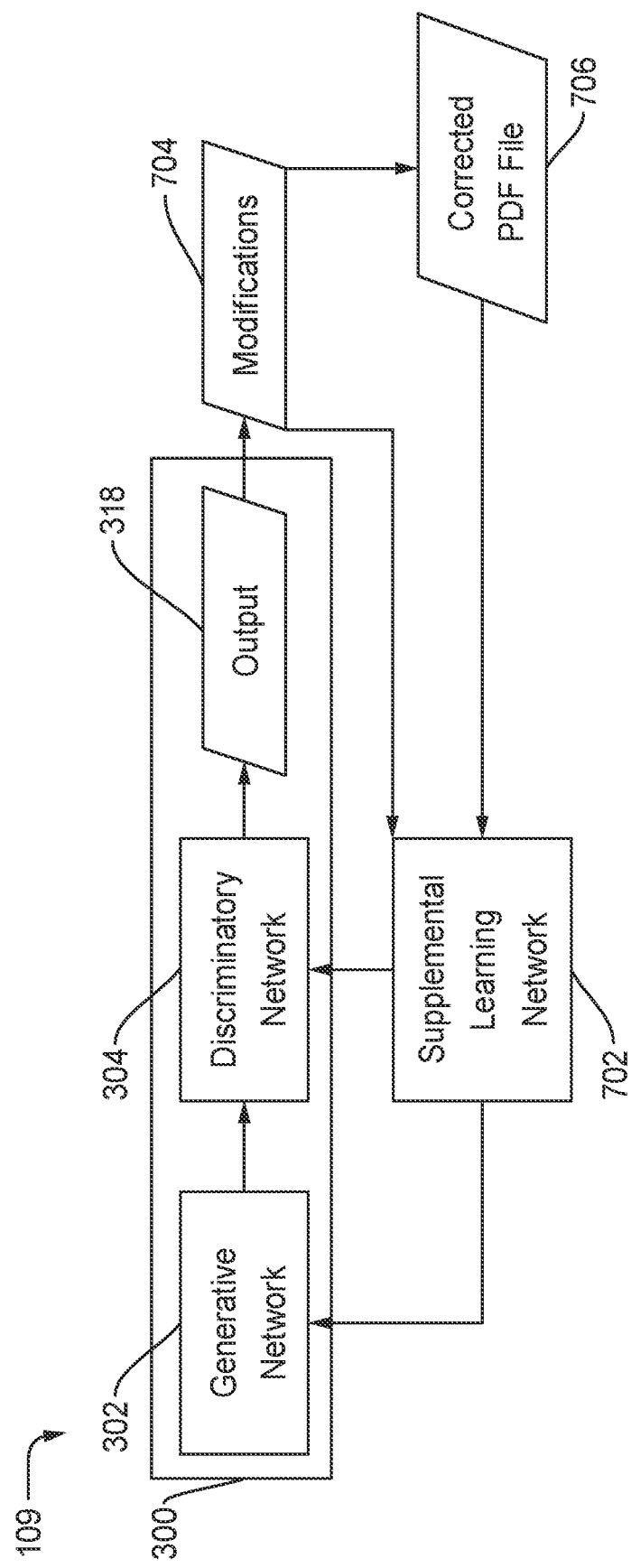
FIG. 7 illustrates a block diagram of the preflight system with the generative adversarial network having a supplemental learning network according to the disclosed embodiments.

FIG. 7 depicts a block diagram of preflight system 109 with generative adversarial network 300 having a supplemental learning network 702 according to the disclosed embodiments. Preflight system 109 may automatically apply modifications to resolve issues identified by preflight operations. The disclosed embodiments would follow the typical preflight correction process. Preflight system 109, however, also performs a secondary preflight process and determines whether the file modification has resolved the issues that were identified in the initial preflight process.

Preflight system 109 may implement supplemental learning network 702 that may be used to determine which preflight corrections actually resolve issues. Output 318 from generative adversarial network 300, or specifically from discriminatory network 304, is used to identify the probability of known issues 322. Output 318 may be used to propose modifications 704 to correct the known issues. These modifications may be applied to the PDF file being analyzed to generate corrected PDF file 706. Preflight system 109 may use supplemental learning network 702 to learn what file modifications 704 actually resolve issues. It also may determine modifications 704 that are needed modifications, which are performed because operators do not understand the low level details about how the RIP processes the PDF file and what actually triggers problems when processing PDF files.

Supplemental learning network 702 may be trained with job processing data from corrected PDF files 706, which may be used to adjust the corrections that applied to future jobs. Supplemental learning network 702 may be trained independently and in parallel from generative adversarial network 300. It, however, may be implemented in the same manner as generative adversarial network 300 to identify problems with job files.

Figure 8:
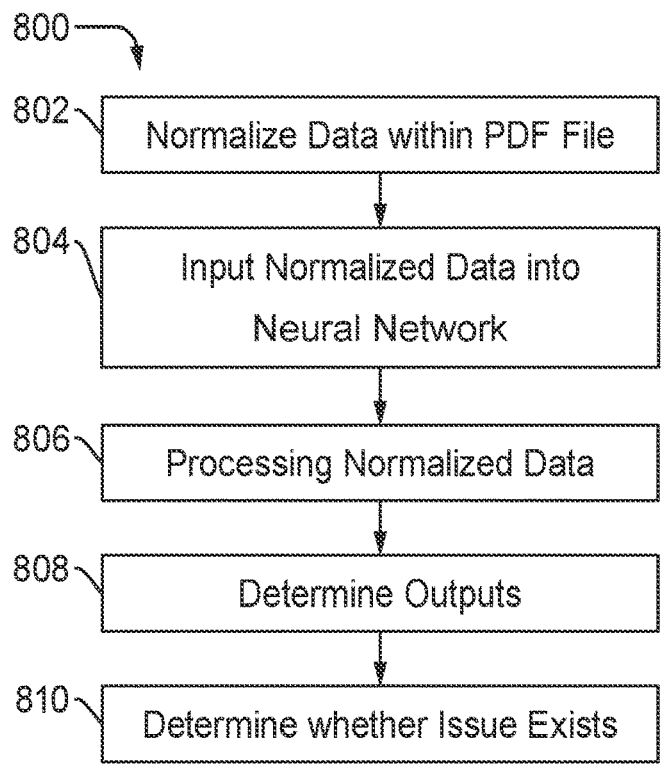
FIG. 8 illustrates a flowchart for performing a check on a print job using the preflight system according to the disclosed embodiments.

FIG. 8 depicts a flowchart 800 for performing a check on a print job 103 using preflight system 109 according to the disclosed embodiments. Flowchart 800 may refer to FIGS. 1A-7 for illustrative purposes. Flowchart 800, however, is not limited to the embodiments disclosed by FIGS. 1A-7.

Step 802 executes by normalizing data within print job 103 and metadata associated with the print job. Preflight system 109 may receive a PDF file 320, which includes a PDF document. Normalization unit 310 may process the data within PDF file 320 into normalized data. This data may include the raw PDF content, the PDF structure, and the PDF content metadata. Normalized data 312 may be generated. In some embodiments, normalized data 312 may be provided to a discriminatory network 304. In other embodiments, it also may be provided to a generative network 302.

Step 804 executes by inputting normalized data 312 into a neural network, such as discriminatory network 304 or generative network 302. Using the discriminatory network example, normalized data 312 may be provided to input layer 402 having input nodes 402A-D. Discriminatory network 304 also includes first hidden layer 404, second hidden layer 406, and output layer 408. First hidden layer 404 includes neural nodes 404A-F. Second hidden layer 406 includes neural nodes 406A-F. Output layer 408 includes output nodes 408A-D.

Step 806 executes by processing the normalized data by the layers within the network. Using the above example, first hidden layer 404 may process the normalized data from input nodes 402. Second hidden layer 406 may further process the outputs from first hidden layer 404. Step 808 executes by determining outputs from the output layer from the hidden layers. Output nodes 408A-D may receive the outputs, or data instances, from each of nodes 406A-F of second hidden layer 406. These data instances may be weighted or summed at each output node in order to identify a change of an error or issue occurring with print job 103.

Step 810 executes by determining whether print job 103 includes a known issue 322 based on the outputs of output nodes 408, or output 318. Output 318 may include values for the percentage or probability that a known error or issue may occur with print job 103. Preflight system 109 may analyze these results to determine whether a problem exists. For example, the output from output node 408B may be above a certain percentage, such as 50%, that indicates a known issue will occur. Preflight system 109 sees this amount and determines an issue may be arise with print job 103. The issue may be addressed prior to printing operations on printing device 104, thereby saving time and resources.

Figure 9:
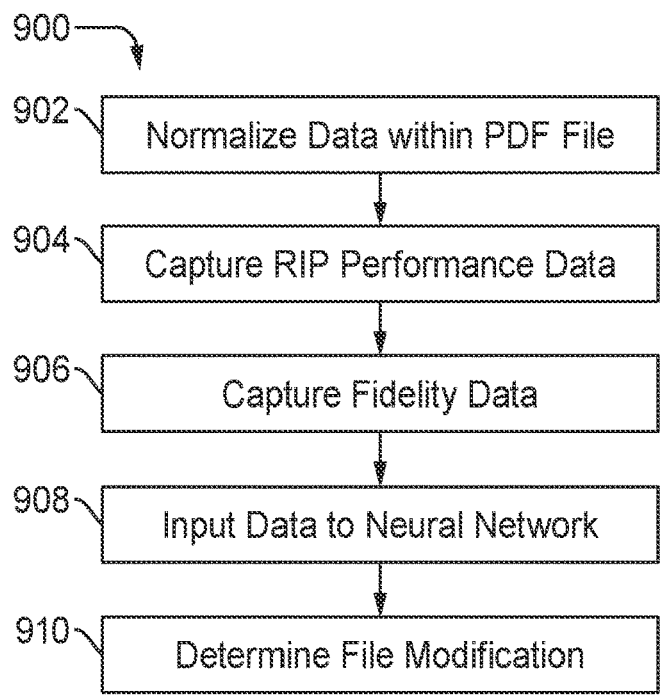
FIG. 9 illustrates a flowchart for using a neural network in checking printing operations within the printing system according to the disclosed embodiments.

FIG. 9 depicts a flowchart 900 for using a neural network in checking printing operations within printing system 100 according to the disclosed embodiments. Flowchart 900 may refer to FIGS. 1A-8 for illustrative purposes. Flowchart 900, however, is not limited by the embodiments disclosed by FIGS. 1A-8.

Step 902 executes by normalizing data within print job 103 and metadata associated with the print job. Step 902 executes similar to step 802 disclosed above. Step 904 executes by capturing RIP performance data generated by print job 103 in DFE 106. Step 906 executes by capturing fidelity data generated while printing print job 103 within printing device 104.

Step 908 executes by inputting the normalized data, the RIP performance data, and the fidelity data to a neural network. Preferably, the neural network is discriminatory network 304. Referring to FIG. 3, discriminatory network 304 receives normalized data 312 and known issues 322. As disclosed above, known issues 322 include RIP performance data and fidelity data. Step 910 executes by determining a file modification 704 to print job 103 based on an output 318 of discriminatory network 304.

Figure 10:
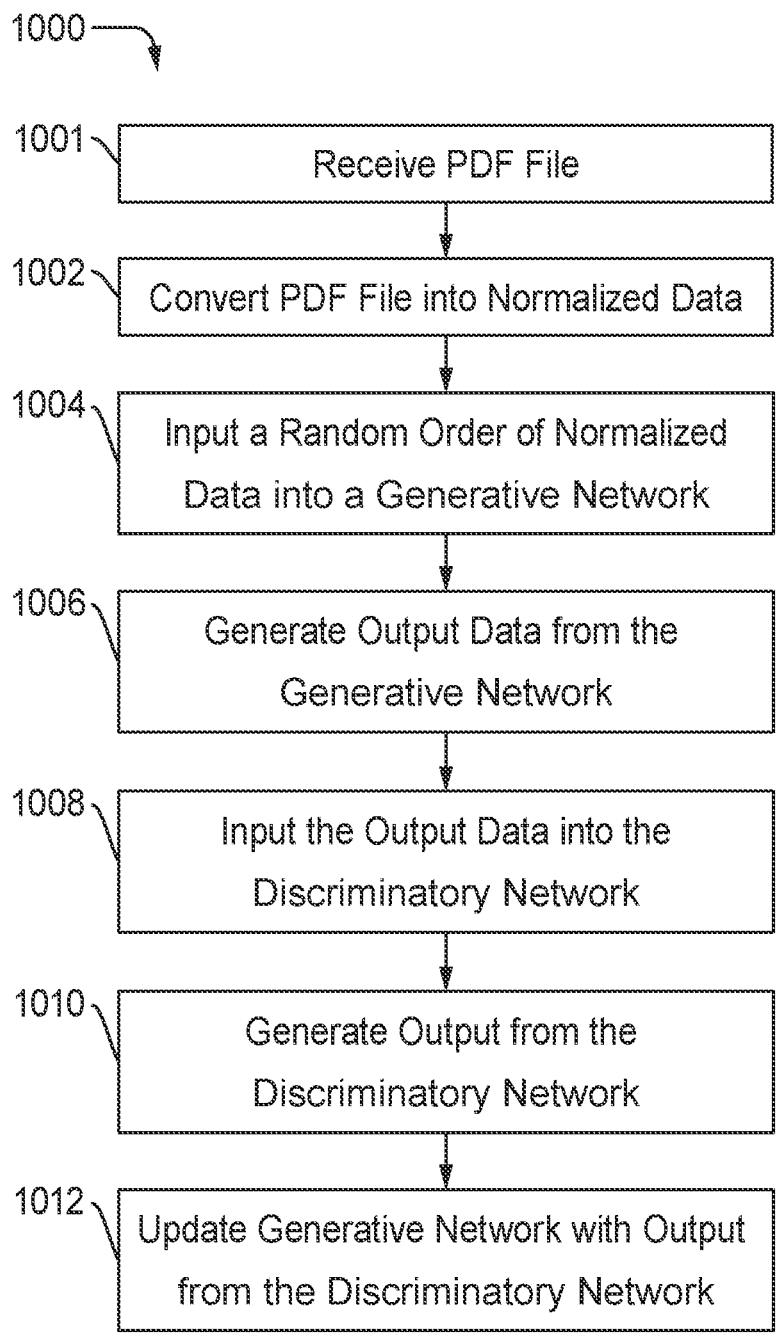
FIG. 10 illustrates a flowchart for using the generative adversarial network in printing operations according to the disclosed embodiments.

FIG. 10 depicts a flowchart 1000 for using generative adversarial network 300 in printing operations according to the disclosed embodiments. Flowchart 1000 may refer to FIGS. 1A-9 for illustrative purposes. Flowchart 1000, however, is not limited to the embodiments disclosed in FIGS. 1A-9.

Step 1001 executes by receiving PDF file 320 related to print job 103 at preflight system 109. Preflight system 109 may provide PDF file 320 to generative adversarial network 300 for training the neural networks. Step 1002 executes by converting PDF file 320 into normalized data 312. This step may be similar to step 802 disclosed above. In this embodiment, however, normalized 312 is provided to generative network 302. Step 1004 executes by inputting a random order of the normalized data into generative network 302. The random order of the normalized data may be caused by error vector 314. Error vector 314 introduces one or more errors into normalized data 312 that should cause a known issue 322 with print job 103.

Step 1006 executes by generating output data, or synthetic data 308 from generative network 302. Synthetic data 308 includes data for a synthetic file 306 that includes a probability of an error. In some instances, this probability may be a high probability of an error to cause a problem within printing device 104 or DFE 106. In other instances, the probability may be low. In a way, synthetic data 308 is similar to normalized data 312 except that it includes a random probability of having the error that is not present in the normalized data converted from PDF file 320.

Step 1008 executes by inputting the output data, or synthetic data 308, from generative network 302 into discriminatory network 304 of generative adversarial network 300. Discriminatory network 304 may treat synthetic data 308 as it does normalized data 312. Step 1010 executes by generating output data 318 from discriminatory network 304 based on synthetic data 308. Output data 318 may include a determination of the probability of the error within synthetic data 308 occurring. Discriminatory network 304 detects the error based on the probability or it does not.

Step 1012 executes by updating generative network 302 using backpropagation of output 318 from discriminatory network 304. According to this determination, output 318 may include generator loss 332. Generator loss 332 is disclosed above. Generator loss 322 may be used to further train generative network 302 to provide synthetic data 308 that better resembles actual normalized data for a print job. Generator loss 332 is backpropagated through discriminatory network 304 to generative network 302. Generative network 302 uses the backpropagated data to modify the weights in its neural network, as disclosed above.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for using a generative adversarial network in printing operations, the method comprising:
   receiving a print job at the generative adversarial network;
   converting a portable document format (PDF) file of the print job into normalized data;
   adding an error vector of a random order of data to introduce an error into the normalized data;
   inputting the normalized data of the print job having the error introduced by the error vector into a generative network of the generative adversarial network;
   generating output data from the generative network, wherein the output data includes data having a probability of the error;
   inputting the output data from the generative network into a discriminatory network of the generative adversarial network; and
   updating the generative network using backpropagation of output from the discriminatory network.

2. The method of claim 1, further comprising determining whether the discriminatory network detects the probability of the error in the output data.

3. The method of claim 2, wherein the output of the discriminatory network relates to the detection of the probability of the error.

4. The method of claim 1, wherein updating the generative network includes updating weights within the generative network with the output of the discriminatory network.

5. The method of claim 4, further comprising adjusting weights within the generative network based on the output of the discriminatory network.

6. The method of claim 1, further comprising transforming the random data into a data instance for the probability of the error.

7. The method of claim 1, wherein converting includes converting text files of the print job into pre-set dictionaries.

8. The method of claim 1, wherein the output includes generative loss data generated by the discriminatory network.

9. A method for using a generative adversarial network to detect potential problems in printing operations, the method comprising:
   generating output data from a generative neural network using random normalized data by
     receiving a first print job at the generative neural network,
     converting a portable document format (PDF) file of the print job into normalized data,
     adding an error vector of a random order of data to introduce an error into the normalized data to generate the random normalized data, and
     inputting the random normalized data of the first print job having the error introduced by the error vector into the generative neural network of the generative adversarial network;
   training a discriminatory neural network using the output data of the generative neural network, wherein output data of the discriminatory neural network is backpropagated the generative neural network;
   receiving a second print job;
   converting the second print job into normalized print job data;
   inputting the second print job into the discriminatory neural network; and
   determining the probability of an error within the second print job using the discriminatory neural network.

10. The method of claim 9, further comprising inputting raster image processing (RIP) performance data into the discriminatory neural network.

11. The method of claim 9, further comprising inputting fidelity data with the random normalized data.

12. The method of claim 9, further comprising generating generative loss data by the discriminatory neural network, wherein the generative loss data is backpropagated to the generative neural network.

13. A printing system having a generative adversarial network for printing operations, the printing system comprising:
   a processor;
   a computer readable storage device; and
   stored program instructions embodied on a non-transitory computer readable storage medium of the computer readable storage device for execution by the processor, the stored program instructions configure the printing system to
   generate output data from a generative neural network using random normalized data, wherein the generative neural network is configured to
     receive a first print job at the generative neural network,
     convert a portable document format (PDF) file of the print job into normalized data,
     add an error vector of a random order of data to introduce an error into the normalized data to generate the random normalized data, and
     input the random normalized data of the first print job having the error introduced by the error vector into the generative neural network of the generative adversarial network;
   train a discriminatory neural network using the output data of the generative neural network, wherein output data of the discriminatory neural network is backpropagated into the generative neural network;
receive a second print job;
convert the second print job into normalized print job data;
input the second print job into the discriminatory neural network; and
determine the probability of an error within the second print job using the discriminatory neural network.

14. The printing system of claim 13, further comprising a printing device to receive the second print job.

15. The printing system of claim 13, wherein the printing system is further configured to generate generative loss data by the discriminatory neural network, wherein the generative loss data is backpropagated to the generative neural network.

* * * * *